Jan. 18, 1966     W. E. FOLKERTS     3,229,987
FLOATING SEAL FOR A PUMP SHAFT
Filed Dec. 1, 1961     2 Sheets-Sheet 1
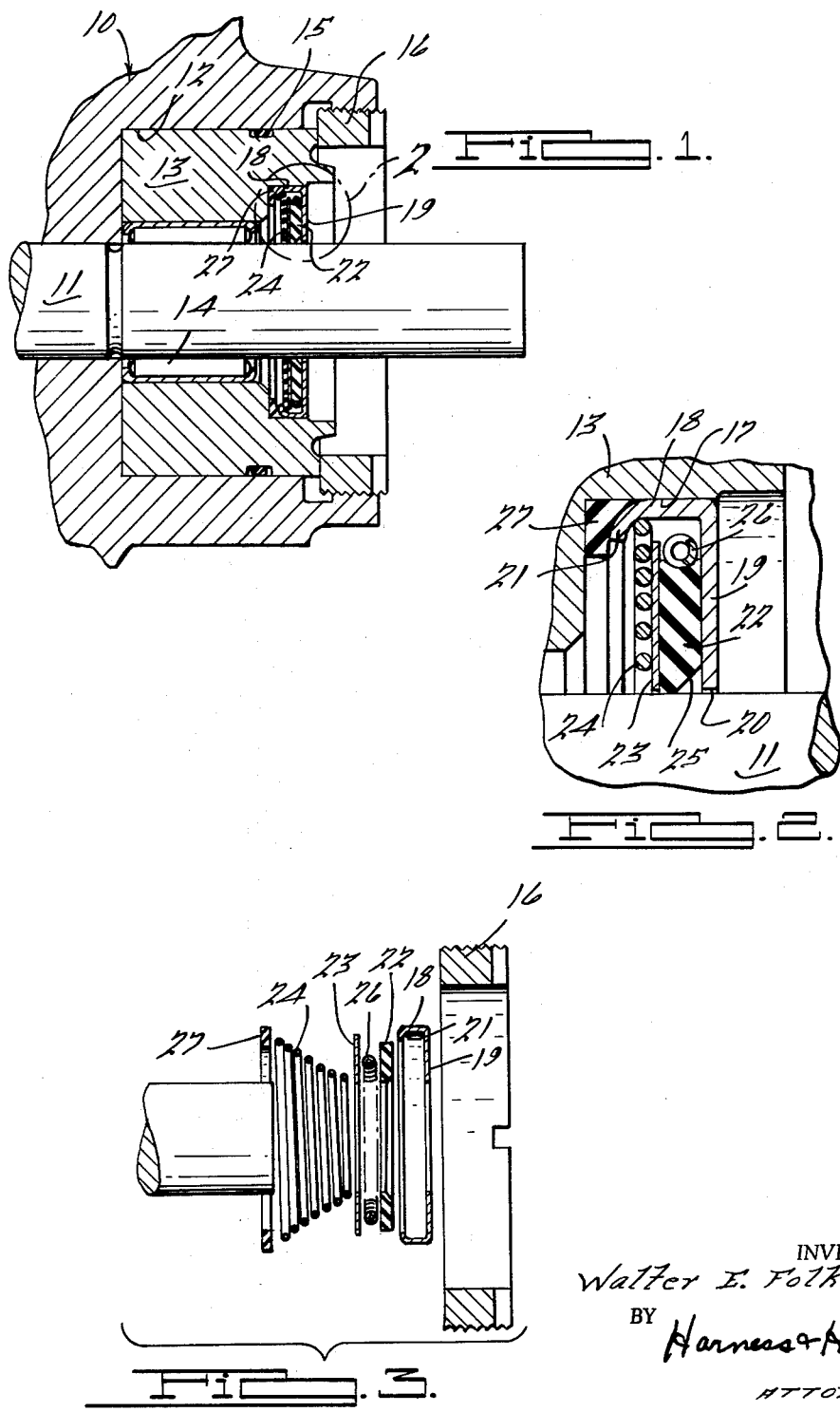
INVENTOR.
Walter E. Folkerts
BY Harness & Harris
ATTORNEYS

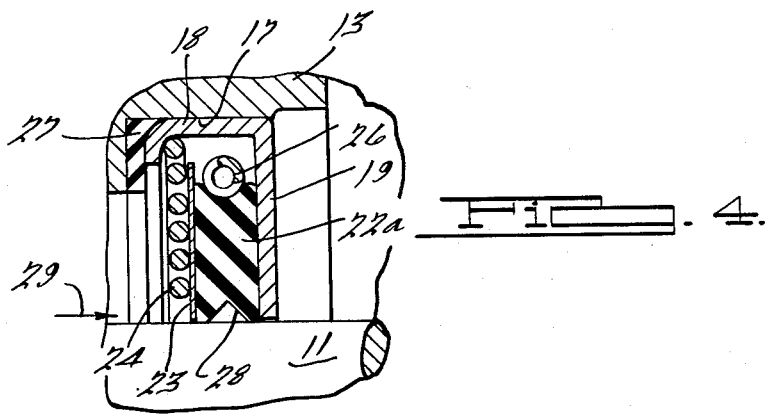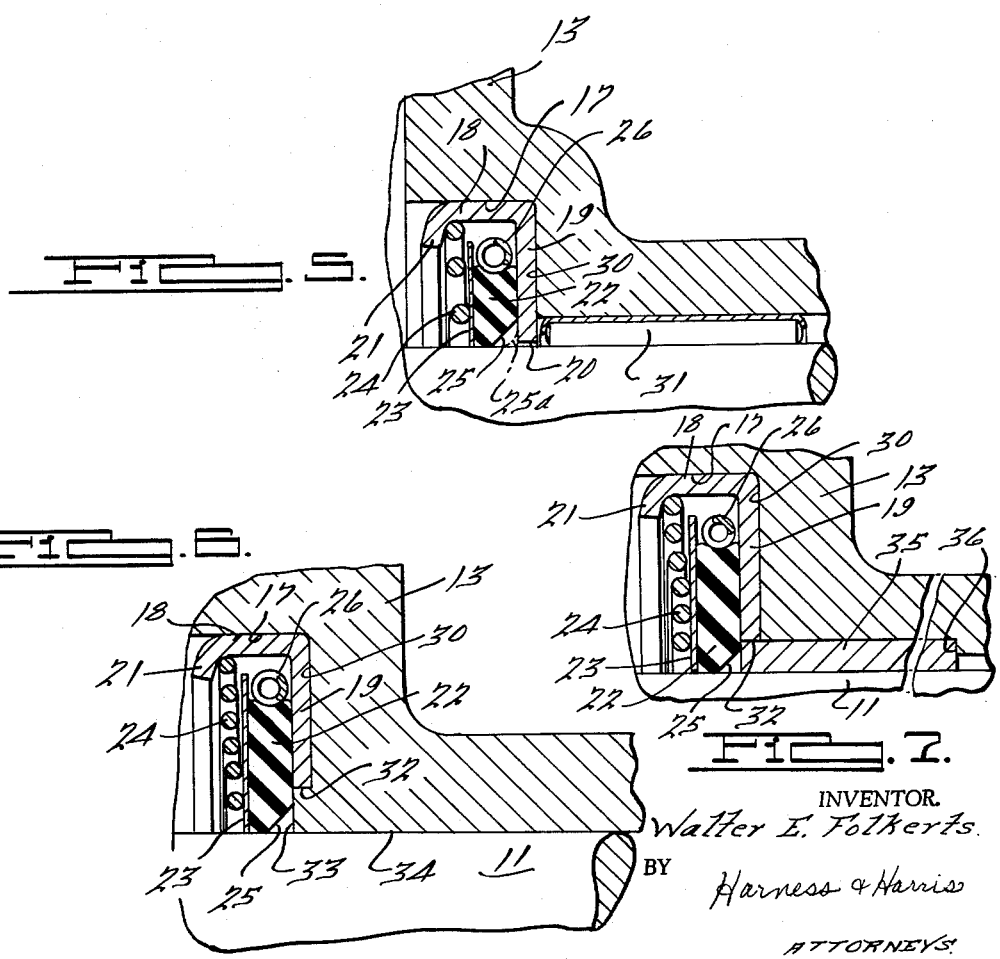

United States Patent Office 3,229,987
Patented Jan. 18, 1966

3,229,987
FLOATING SEAL FOR A PUMP SHAFT
Walter E. Folkerts, Hazel Park, Mich., assignor to Chrysler Corporation, Highland Park, Mich., a corporation of Delaware
Filed Dec. 1, 1961, Ser. No. 156,302
4 Claims. (Cl. 277—48)

This invention relates to a fluid seal particularly for the rotating shaft of a hydraulic pump, for example, and has for an important object the provision of a self-contained seal which is characterized by its structural simplicity and economy of manufacture and assembly and which is adapted to be pre-assembled and thereafter installed coaxially around the shaft to complete a seal between the latter and the juxtaposed pump housing.

Another object is to provide such a seal comprising a radially inwardly opening channel shaped annulus of rigid material, one channel side comprising an annular backing plate extending closely to the shaft, the other channel side comprising an abbreviated spring retaining flange. A comparatively thin annular sealing disc of elastic rubber-like material has a low pressure side seated against the backing plate coaxially around the shaft. A thin annular retaining disc is yieldingly urged against the opposite or high pressure side of the sealing disc by a helical spring of conical shape converging toward the retaining disc when in the undeformed condition and retained under compression substantially in a radial plane between the retaining disc and the spring retaining flange.

By virtue of such a structure the sealing and retaining discs are feasibly pre-assembled coaxially within the channel shaped annulus and retained in assembled relation by the conical spring. The assembly is then mounted coaxially around the shaft with the inner circumference of the sealing disc in sealing engagement with the shaft and with the inner circumference of the backing plate and retaining disc spaced slightly from the shaft to provide operating clearance. In order to minimize frictional heating, the low pressure side of the inner circumference of the sealing disc is chamfered to reduce the surface area in sealing contact with the shaft. Also, in order to compensate for wearing of the inner diameter of the sealing disc, a garter spring is arranged under tension around the outer circumference of the sealing disc to exert a radially inward compressional force thereon urging the inner circumference of the sealing disc into its sealing engagement with the shaft. In the assembled seal, the outer periphery of the channel shaped annulus is fitted tightly within a cylindrical recess in the housing for the shaft and is sealed by conventional means.

Another object is to provide an improved pump housing structure and self-contained sealing assembly of the above character wheren a radial wall portion of the housing cooperates with the backing plate to hold the shape of the latter against the fluid pressure exerted on the seal.

Still another object is to provide such a pump housing structure and sealing assembly wherein the inner circumference of the backing plate is spaced appreciably from the shaft to provide an annular space, and an annular projection of the housing structure, which may comprise an integral part thereof or a cylindrical insert or bushing, extends axially into said space and terminates flush with the juxtaposed surfaces of the backing plate and low pressure side of the sealing disc. The housing projection in effect comprises a radially inward extension of the backing plate and cooperates with the latter to support the sealing disc. The inner circumference of the projection comprises a bearing support for the shaft in sufficient proximity thereto to prevent extrusion of the sealing disc between the shaft and housing structure as a result of the high pressure differential across the seal.

Other objects of this invention will appear in the following description and appended claims, reference being had to the accompanying drawings forming a part of this specification wherein like reference characters designate corresponding parts in the several views.

FIGURE 1 is a fragmentary sectional view through a pump housing embodying the present invention, taken longitudinally of the axis of the rotating shaft.

FIGURE 2 is a fragmentary enlarged view showing details of the seal enclosed within the dotted circle 2 of FIGURE 1.

FIGURE 3 is an exploded view showing the elements of the seal prior to assembly.

FIGURES 4, 5, 6, and 7 are views similar to FIGURE 2, illustrating modifications of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to FIGURES 1–3, an application of the present invention is illustrated by way of example in a hydraulic pump comprising a housing 10 having a rotatable pump shaft 11 journaled therein. The housing 10 is provided with a cylindrical recess 12 coaxial with shaft 11 and containing an annular bearing support or housing 13 having its outer periphery snugly confined within the recess 12. The inner circumference of the housing 13 is spaced from the shaft 11 to provide for an annular needle bearing set 14 in bearing and supporting engagement with the shaft 11. A suitable seal 15 is provided between the outer circumference of the support 13 and housing 10. An annular retaining nut 16 screwed into the open end of recess 12 snugly against the housing 13 retains the latter in assembled position.

Referring to FIGURES 2 and 3, the housing 13 is provided with a cylindrical recess 17 coaxial with shaft 11 and containing a radially inwardly opening channel shaped annulus 18. The latter may be of steel or similar rigid material, one channel side of which comprises an annular backing plate 19 extending radially towards the shaft 11 and spaced slightly therefrom to provide an operating clearance 20. The opposite channel side of annulus 18 comprises an annular spring retaining flange 21. An elastic annular disc 22 of rubber or rubber-like material has a low pressure side seated against the inner surface of plate 19 coaxially around shaft 11. A thin annular retaiing disc 23 of rigid material such as shim stock is urged against the opposite or high pressure side of sealing disc 22 by means of a helical spring 24 under compression between retainer 23 and the flange 21. As illustrated in FIGURE 3, spring 24 in the uncompressed state is conical in shape converging in the direction towards retainer 23, the larger diameter of the spring 24 extending approximately to the radially outer portion of the annulus 18 and being confined against leftward axial movement by the flange 21.

In order to provide adequate heat dissipating surface area for the disc 22 with respect to its volume of material, so as to prevent overheating of its inner circumference in sealing engagement with shaft 11, the diameter of the disc 22 is appreciably larger than its axial width. Also, in order to minimize the area of surface contact between shaft 11 and the inner circumference of the disc 22, the low pressure side of its inner circumference is chamfered at 25, thereby to further reduce the frictional heating of the sealing disc. An annular garter spring 26 is provided under tension around the outer circumference of the disc 22 urging the latter radially inward to maintain the sealing engagement between disc 22 and shaft 11 regardless of ordinary wearing of the seal.

In the present instance, the outer surface of the annulus 18 is press fit tightly into the recess 17 so as to hold the seal in place against fluid pressure applied axially along shaft 11 from left to right in FIGURES 1 and 2. A suitable gasket 27 of such material as cork, rubber impregnated cork or paper, or the like, is compressed between the flange 21 and the confronting wall of the housing 13 to effect a fluid seal between these members. By virtue of the structure shown, the sealing assembly including the annulus 18, discs 22 and 23, and springs 24 and 26 may be pre-assembled and thereafter forced into recess 17 coaxially around shaft 11 and against the gasket 27.

FIGURE 4 illustrates a sealing structure similar to that of FIGURE 2 wherein the sealing disc 22a is slightly wider than the disc 22 and is provided with a V-notch 28 in its inner circumference in place of the chamfer 25. The lefthand lip of the inner circumference of disc 22a in sealing contact with shaft 11 provides a seal for fluid pressure exerted axially of the shaft 11 in the direction of the arrow 29, FIGURE 4, that is from left to right as in FIGURE 2. The structure also provides a dirt shield by virtue of the righthand lip of the inner circumference of disc 22a in sealing contact with the shaft 11.

FIGURE 5 illustrates a seal similar to that of FIGURE 2 except that the housing 13 is provided with a radial shoulder 30 which backs the plate 19 to prevent deformation of the latter when subject to very high pressures, as for example in a hydraulic pump used for supplying vehicle power steering fluid. Either supplemental to or in lieu of bearing 14, the structure of FIGURE 5 employs an annular needle bearing set 31 coaxially around shaft 11 in bearing support therefor at the low pressure side of the plate 19. In this construction, the clearance 20 will be sufficiently small to prevent extrusion of the material of the sealing disc 22 into the region of the bearing 31, the likelihood of extrusion being further minimized by reason of the chamfer 25. As illustrated in FIGURE 5, during operation at high pressure, the material of the disc 22 will be compressed closely toward the space 20 substantially to the dotted line 25a.

FIGURE 6 illustrates a sealing structure similar to that of FIGURE 5 except that the backing plate 19 terminates sufficiently short of the shaft 11 to provide an appreciable annular space 32 around the shaft 11. The housing 13 is provided with an integral annular projection 33 which terminates in radial alignment with the low pressure side of disc 22 and the juxtaposed surface of plate 19 to provide in essence a radially inward continuation of the latter. The inner circumference of the projection 33 comprises a bearing surface 34 in proximate bearing and supporting engagement with the shaft 11.

FIGURE 7 illustrates a seal similar to that of FIGURE 6, except that instead of the integral projection 33, an annular bushing 35 extends into the space 32 and terminates flush with the low pressure side of disc 22. The right end of bushing 35 is supported by an annular shoulder 36 of the housing 13 to prevent rightward displacement of the bushing 35 in consequence of the application of high fluid pressure at the left side of the seal. The structures of both FIGURES 6 and 7 are adapted for particular high pressure sealing applications and provide uninterrupted backing for the low pressure side of the sealing disc 22. Thus bearing support for the shaft 11 is provided and at the same time the possibility of extruding the seal 22 axially along the shaft 11 between the latter and bearing surface 34 or bearing 35 is positively avoided.

I claim:

1. In combination, a housing structure having an annular recess therein, a rotatable shaft extending axially through said recess, an annular backing plate around said shaft, said backing plate having an outer axially extending flange engaging the circumferential wall of said recess to support said plate and terminating in a radially inbent retainer, means for providing a fluid seal around said shaft effective to contain comparatively high pressure fluid from flowing axially along said shaft in the direction from said retainer toward said backing plate during high speed rotation of said shaft comprising a thin annular sealing disc of deformable material seated against said plate around said shaft and having its inner circumference in sealing engagement with said shaft, the side of said plate remote from said inbent retainer seating against an annular wall portion of said housing in supported relation at the low pressure side of said seal, the inner periphery of said plate having a diameter greater than the diameter of said shaft, said housing having an annular projection extending axially into the central opening of said plate adjacent the latter and said shaft to prevent extrusion of said sealing disc into said opening and terminating in an annular surface flush with the radial surface of said sealing disc and the juxtaposed surface of said plate at said low pressure side of said seal to prevent shearing of said sealing disc, resilient means around the outer periphery of said sealing disc urging the inner circumference of the latter radially inwardly into said sealing engagement, and resilient means interposed between said retainer and sealing disc to urge the latter against said plate.

2. In combination, a housing structure having an annular recess therein, a rotatable shaft extending axially through said recess, an annular backing plate around said shaft, said backing plate having an outer axially extending flange engaging the circumferential wall of said recess to support said plate and terminating in a radially inbent retainer, means for providing a fluid seal around said shaft effective to contain comparatively high pressure fluid from flowing axially along said shaft in the direction from said retainer toward said backing plate during high speed rotation of said shaft comprising a thin annular sealing disc of deformable material seated against said plate around said shaft and having its inner circumference in sealing engagement with said shaft, the side of said plate remote from said inbent retainer seating against an annular wall portion of said housing in supported relation at the low pressure side of said seal, the inner diameter of said plate being greater than the diameter of said shaft, means to prevent shearing of said sealing disc and extrusion thereof into said opening around said shaft comprising an annular projection of said housing extending axially into the central opening of said plate adjacent the latter and said shaft and having said shaft journaled therein, said projection terminating axially in an annular surface flush with the radial surface of said sealing disc and the juxtaposed surface of said plate at said low pressure side of said seal, resilient means around the outer periphery of said sealing disc urging the inner circumference of the latter radially inwardly into said sealing engagement, and retaining means including resilient means interposed between said retainer and sealing disc to urge the latter axially against said plate.

3. In combination, a housing structure having an annular recess therein, a rotatable shaft extending axially through said recess, an annular backing plate around said shaft, said backing plate having an outer axially extending flange engaging the circumferential wall of said recess to support said plate and terminating in a radially inbent retainer, means for providing a fluid seal around said shaft effective to contain comparatively high pressure fluid from flowing axially along said shaft in the direction from said retainer toward said backing plate during high speed rotation of said shaft comprising an annular sealing disc of deformable material seated against said plate around said shaft and having its inner circumference in sealing engagement with said shaft, the side of said plate remote from said inbent retainer seating against an annular wall portion of said housing in supported relation at the low pressure side of said seal, the inner circumference of said plate being spaced annularly from said shaft, means to prevent shearing of said sealing disc and extrusion thereof into said opening around said shaft comprising an annular insert confined within said housing coaxially with said shaft and having the latter journaled therein, one end of said insert extending axially into the annular space between said shaft and plate to fill said space and terminating in a radial surface flush with the juxtaposed radial surfaces of said sealing disc and plate at said low pressure side of said seal, resilient means around the outer periphery of said sealing disc urging the inner circumference of the latter radially inwardly into said sealing engagement, and retaining means including resilient means interposed between said retainer and sealing disc to urge the latter axially against said plate.

4. In combination, a housing structure for a high pressure fluid and having an annular recess therein, a rotatable shaft extending axially through said recess, an annular channel shaped member confined within said recess and having an integral annular backing plate and a retainer comprising opposite coaxial channel sides respectively of said member, said backing plate extending coaxially around said shaft and radially inwardly appreciably beyond the inner circumference of said retainer, the outer channel surface of said backing plate seating against an annular wall of said housing in supported relation, means for providing a fluid seal around said shaft effective to contain comparatively high pressure fluid from flowing axially along said shaft in the direction from said retainer toward said backing plate during high speed rotation of said shaft comprising a thin annular sealing disc of deformable material confined within the channel of said member and having a low pressure side seated against the inner surface of said plate around said shaft, the inner circumference of said sealing disc being in sealing engagement with said shaft, resilient means around the outer periphery of said sealing disc urging the inner circumference of the latter radially inwardly into said sealing engagement, and retaining means including resilient means interposed between said sealing disc and the inner channel surface of said retainer to urge said sealing disc against said plate, the side of said sealing disc confronting said retainer comprising a high pressure side, the low pressure side of said sealing disc adjacent its inner circumference being chamfered to reduce the axial thickness of said sealing disc in sealing engagement with said shaft, the inner diameter of said plate being greater than the diameter of said shaft, means to prevent shearing of said sealing disc and extrusion thereof into said opening around said shaft comprising an annular projection extending axially into the central opening of said plate between the latter and said shaft to fill said opening and terminating in an annular surface flush with the radial surface at the low pressure side of said sealing disc and the juxtaposed surface of said plate.

References Cited by the Examiner
UNITED STATES PATENTS

| | | | |
|---|---|---|---|
| 2,015,831 | 10/1935 | Winter | 277—47 |
| 2,161,672 | 6/1939 | Gilman | 277—41 |
| 2,420,039 | 5/1947 | Frisby | 277—189 X |
| 2,565,675 | 8/1951 | Bottomley et al. | 277—40 |
| 2,707,118 | 4/1955 | Swartz et al. | 277—27 |
| 2,768,849 | 10/1956 | Riesing | 277—153 |
| 2,907,594 | 10/1959 | Macks | 277—40 X |
| 3,084,945 | 4/1963 | Alexander | 277—112 X |

LAVERNE D. GEIGER, *Primary Examiner.*
SAMUEL B. ROTHBERG, LEWIS J. LENNY,
*Examiners.*